April 5, 1966   F. F. HALL, JR   3,244,879
DUAL SPECTRAL REGION SCANNING MONOCHROMATOR
Filed April 2, 1962   7 Sheets-Sheet 4

INVENTOR.
FREEMAN F. HALL, JR.
BY Alfred C. Hill
AGENT

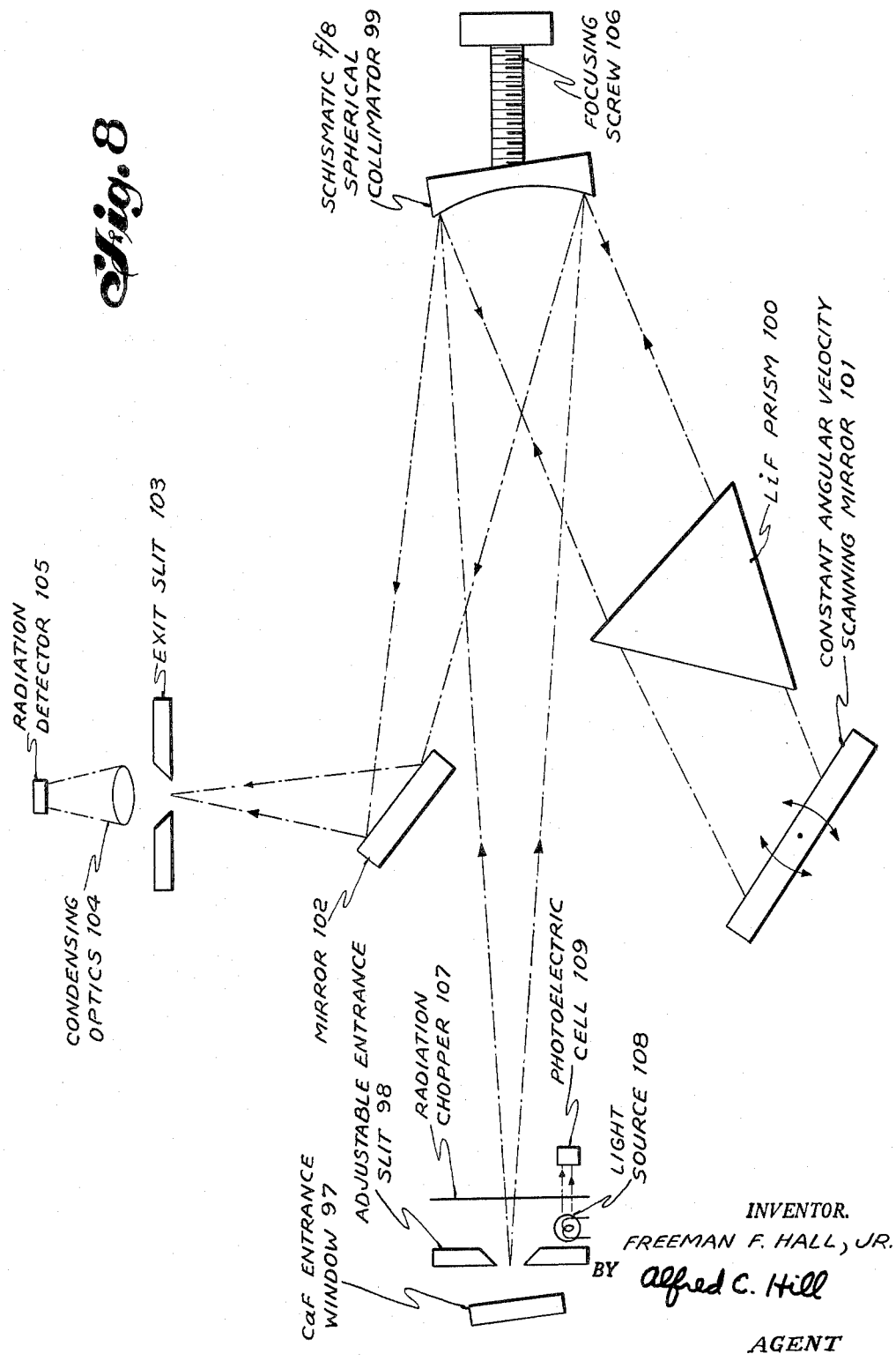

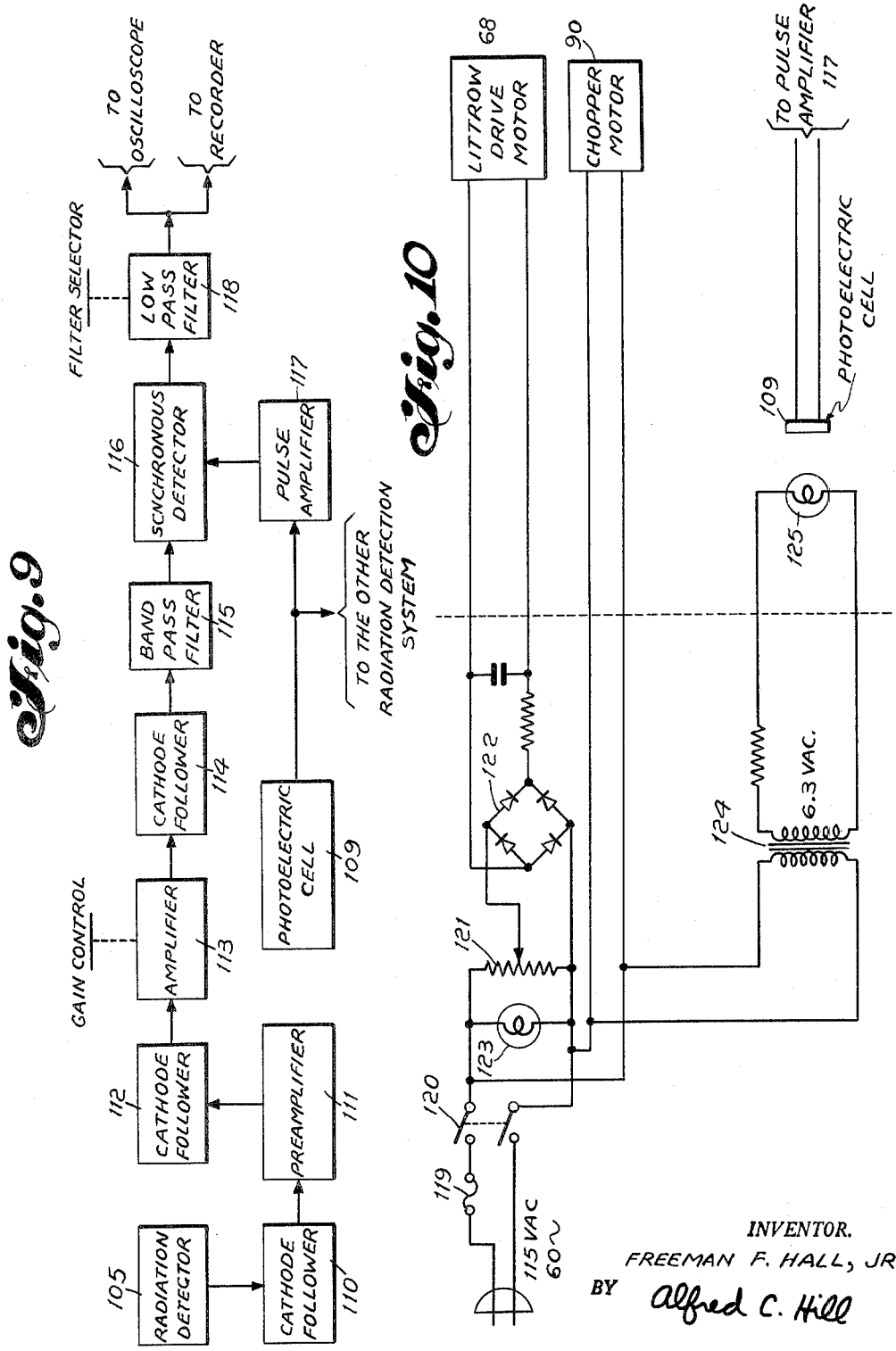

United States Patent Office 3,244,879
Patented Apr. 5, 1966

3,244,879
DUAL SPECTROL REGION SCANNING
MONOCHROMATOR
Freeman F. Hall, Jr., Granada Hills, Los Angeles, Calif., assignor to International Telephone and Telegraph Corporation, Nutley, N.J., a corporation of Maryland
Filed Apr. 2, 1962, Ser. No. 184,085
12 Claims. (Cl. 250—83.3)

This invention relates to monochromators and more particularly to a monochromator capable of scanning simultaneously two different predetermined spectral regions.

Monochromators heretofore known have been capable of scanning only a single narrow range of wavelengths because of the lack of sensitive detectors to cover a wide spectral region, for example, in both the ultraviolet and infrared spectral regions.

An object of the present invention is to provide a monochromator capable of scanning a wider spectral region than heretofore known monochromators.

Another object of this invention is to provide a monochromator of the single pass Littrow type capable of scanning simultaneously two different spectral regions.

A feature of this invention is the provision of a monochromator comprising an input means for white light, means in communication with the input means to simultaneously scan two different predetermined spectral regions, and a separate output means for each of said spectral regions in communication with the means to scan.

Another feature of this invention is the provision of a Littrow mirror horizontally divided into two independently adjustable portions. The top portion is adjustable to disperse one of the spectral regions across the upper exit slit and the bottom portion is adjustable to disperse the other spectral region across the lower exit slit when the Littrow mirror is driven for scanning purposes.

Still another feature of this invention is the provision of a collimating mirror horizontally divided into two independently adjustable portions so that the top portion disperses one of the spectral regions across the upper exit slit and the bottom portion disperses the other spectral region across the lower exit slit when the Littrow mirror is driven for scanning purposes.

A further feature of this invention is the provision of a driving arrangement for the Littrow mirror including a cam driven from an adjustable timing belt. The cam may be configured to provide linear dispersion in either of the spectral regions to permit easier data reduction.

Another feature of this invention is the provision of a continuously variable entrance slit disposed in registry with an entrance window angled with respect to the entrance slit to prevent multiple reflections from entering the entrance slit.

Another feature of this invention is the provision of a chopper arrangement disposed adjacent either the entrance or exit slits to modulate the radiation of both spectral regions and to produce a synchronizing signal to permit synchronous detection of the modulated radiation of the spectral regions.

The above-mentioned and other features and objects of this invention will become more apparent by reference to the following description taken in conjunction with the accompanying drawings, in which:

FIG. 7 is an elevational view partially in cross section taken along line 7—7 of FIG. 1;

FIG. 8 is a schematic top plan view of another embodiment of a monochromator following the principles of this invention;

FIG. 9 is a schematic view in block form of one radiation detection channel responsive to the radiation of one spectral region passed through the appropriate exit slit; and FIG. 10 is a schematic diagram partially in block form of the power supply for the monochromator of this invention.

Figure 1:
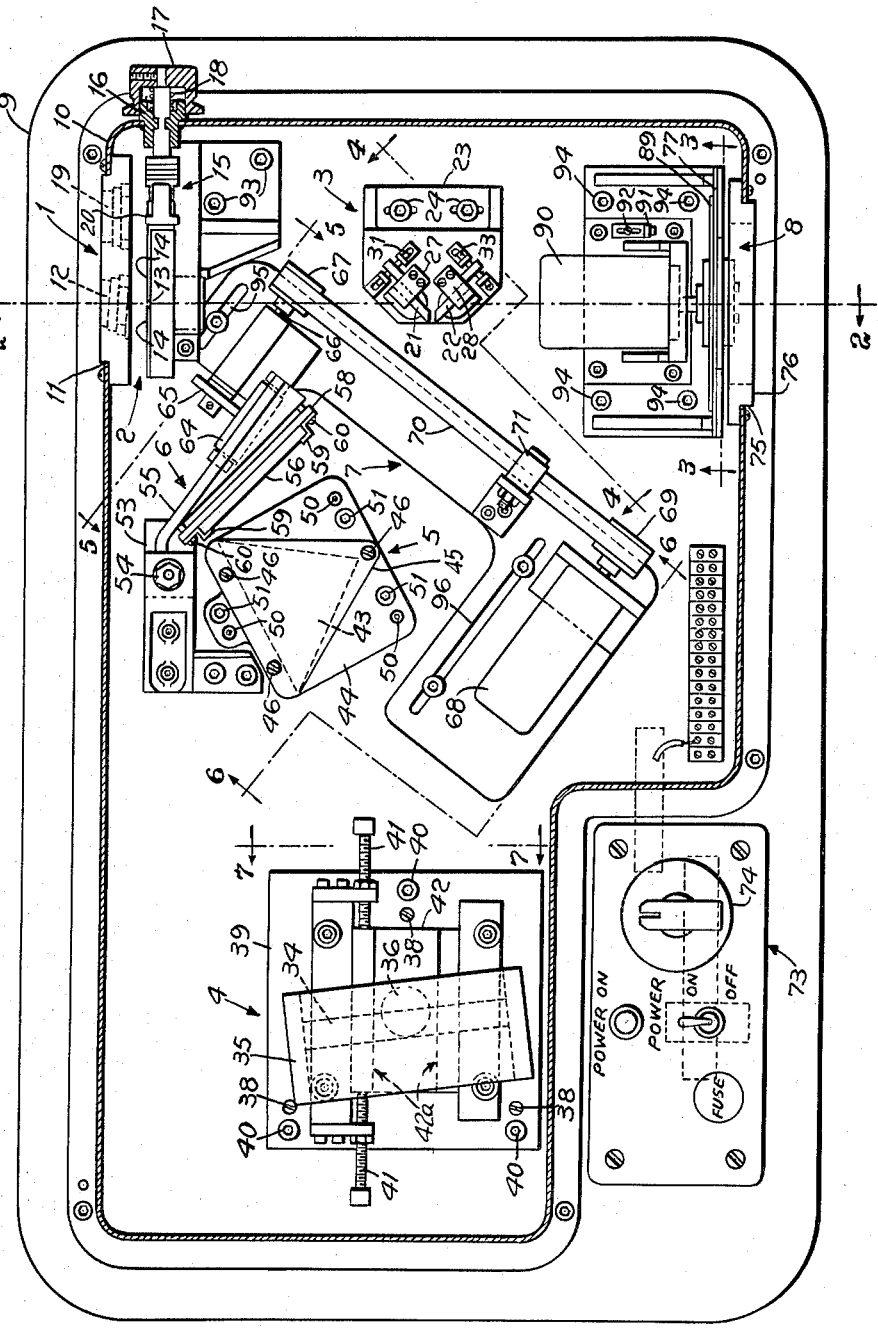
FIG. 1 is a top plan view with the cover removed of one embodiment of a monochromator following the principles of this invention.

Referring to FIGS. 1 through 7, there is illustrated therein one embodiment of a single pass Littrow type monochromator according to the principles of this invention which is capable of scanning simultaneously two different predetermined spectral regions, for example, 0.2 to 0.4 micron, a portion of the ultraviolet spectrum, and 1.0 to 5.0 micron, a portion of the infrared spectrum. Broadly, the monochromator illustrated includes an input means comprising entrance window assembly 1 and entrance slit assembly 2. The scanning means includes split mirror assembly 3, collimating mirror assembly 4, dispersing prism assembly 5, Littrow mirror assembly 6, and Littrow mirror driving assembly 7. The output means includes exit slit assembly 8 having two separate slits arranged in a single vertical plane with the top slit passing the infrared spectral region and the bottom slit passing the ultraviolet region.

To facilitate the description of the monochromator illustrated in FIGS. 1 through 7, each of the assemblies broadly mentioned hereinabove will be described in more detail as to its structure and function. Following this detailed description, the manner of aligning the equipment to obtain the scanning of the desired spectral regions will be presented.

Figure 2:
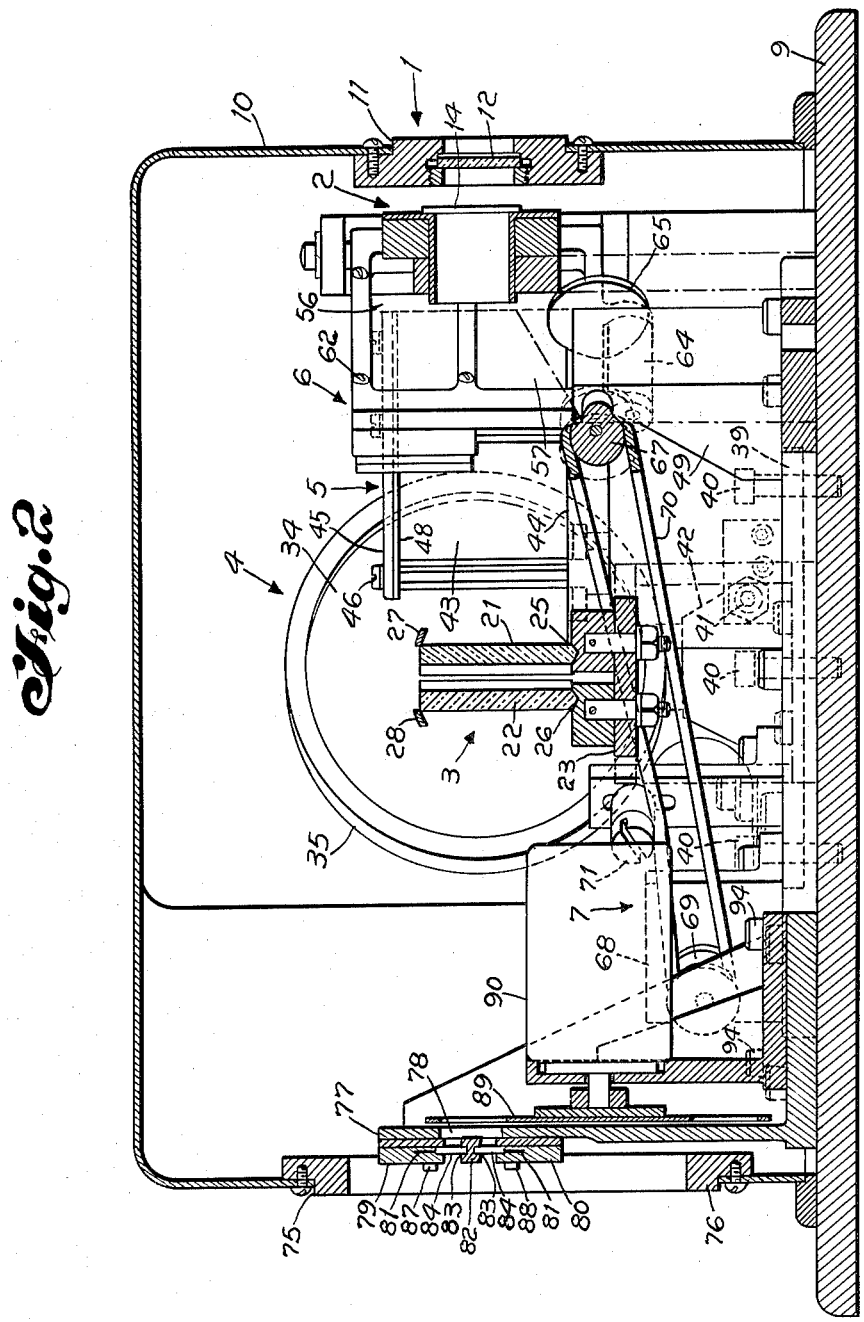
FIG. 2 is an elevational view partially in cross section taken along line 2—2 of FIG. 1.

Referring to FIGS. 1 and 2, a base member 9 is provided having the top surface thereof acting as a reference surface for mounting or positioning all the assemblies incorporated in the monochromator. Fastened to base 9 is an enclosure 10 to enclose the various assemblies of the monochromator in a light sealing relation to block out spurious light. In a vertical wall of enclosure 10 is provided an aperture 11 to receive the entrance window assembly 1. Entrance window assembly 1 is disposed in aperture 11 in a sealing relationship therewith and includes entrance window 12, for example, a calcium fluoride window, angled with respect to entrance slit assembly 2 to permit light to enter the monochromator from an external source and, due to the angled relationship between window 12 and entrance slit assembly 2, to prevent troublesome multiple reflections from entering entrance slit 13 of assembly 2 which is registered with window 12.

Entrance slit assembly 2 includes two blades 14 coupled to a micrometer 15 which will move blades 14 uniformly about a fixed axis as controlled by the micrometer screw to adjust the width of entrance slit 13 formed between blades 14. The shaft of micrometer 15 extends through enclosure 10 in a sealed relationship therewith. On the end of this shaft is coupled friction clutch 16 and knob 17. When knob 17 is depressed to engage clutch 16 and rotated, the position of blades 14 and, hence, the width of entrance slit 13 can be adjusted. Once the slit width is obtained, knob 17 returns to a disengaged position by the action of spring 18, thereby insuring that the slit width will not be accidentally changed during operation.

Entrance window assembly 1 further includes a window 19 which is opaque to ultraviolet and infrared wavelengths, such as a Corning "Aklo" glass window, thus avoiding scattered radiation within the monochromator. Window 19 is in registry with micrometer thimble 20 and, thus, the dimension of the slit width may be directly read from thimble 20.

Figure 4:
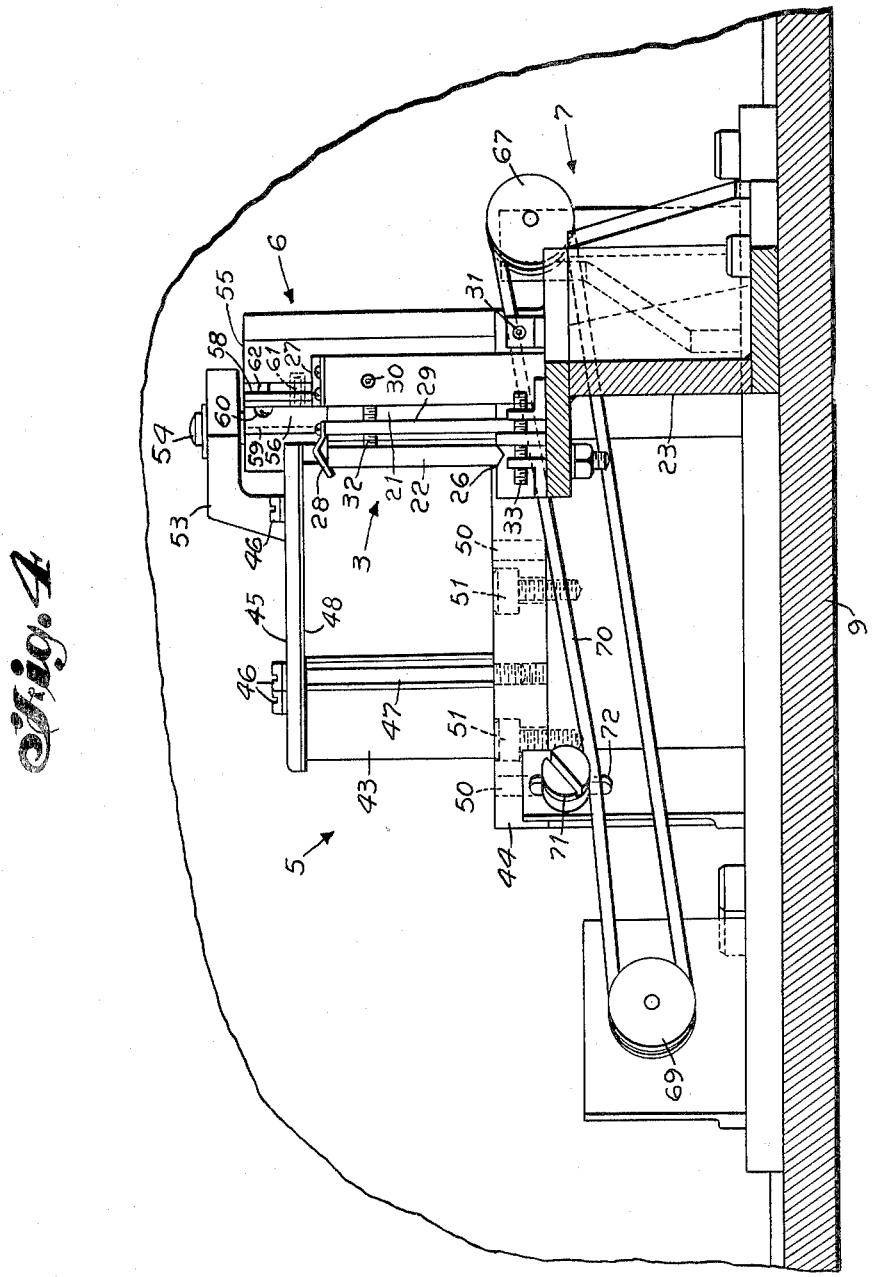
FIG. 4 is an elevational view partially in cross section taken along line 4—4 of FIG. 1.
Figure 5:
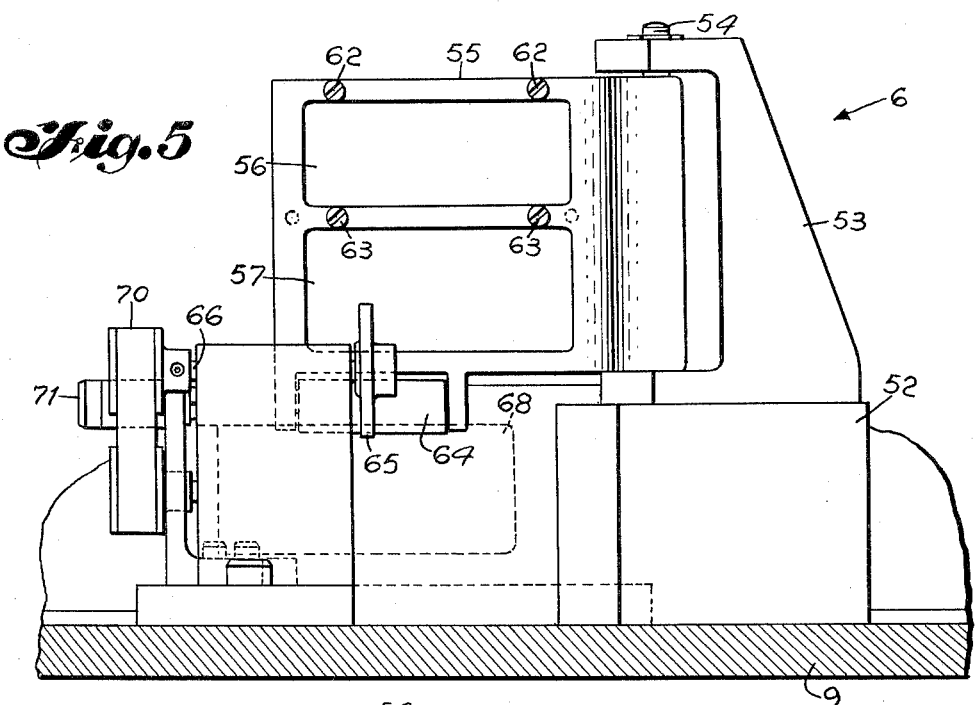
FIG. 5 is an elevational view partially in cross section taken along line 5—5 of FIG. 1.
Figure 6:
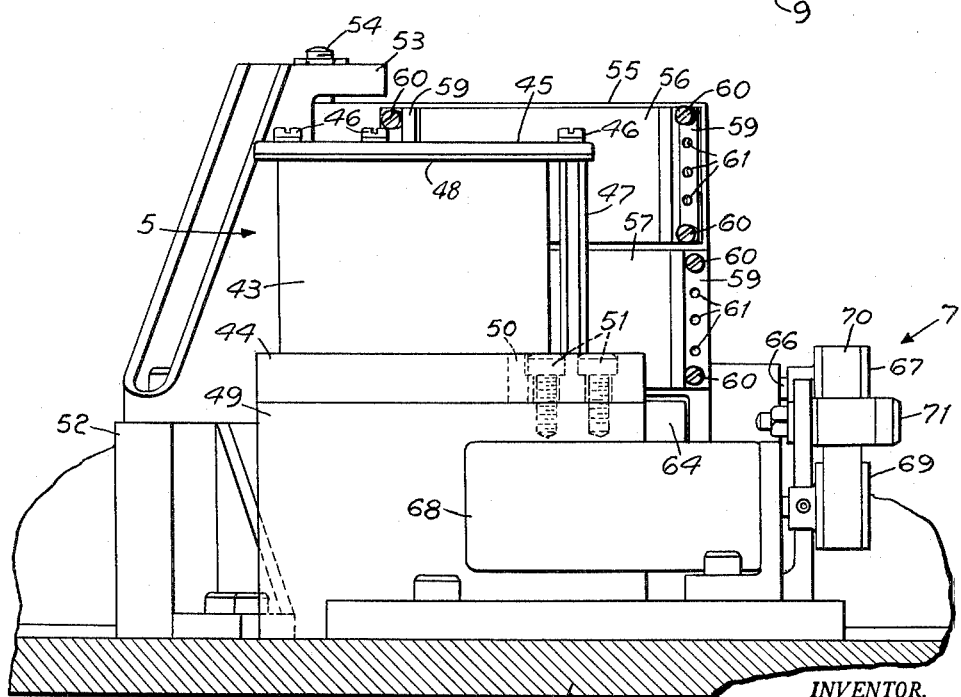
FIG. 6 is an elevational view partially in cross section taken along line 6—6 of FIG. 1.

Referring to FIGS. 1, 2, and 4, split mirror assembly 3 is illustrated as including two independently adjustable plane mirrors 21 and 22 mounted on a common base member 23 whose position relative to slit 13 may be adjusted by sliding in slots 24. Mirrors 21 and 22 are supported at their bottom in the V-slots 25 and 26, respectively, and at their top by spring members 27 and 28, respectively, supported from upright 29. Mirror 21 is adjusted to be perpendicular with respect to base 9 by adjustment screw 30 and may be rotated to adjust the light communication path from slit 13 to assembly 4 by push-pull adjustment device 31. Mirror 22 is adjusted in a similar manner by adjustment screw 32 and push-pull adjustment device 33 to provide a light communication path from assembly 4 to assembly 8.

Referring to FIGS. 1, 2, and 7, collimating mirror assembly 4 is illustrated as including collimating mirror 34 supported in mirror cell 35 to permit mirror 34 to be rotated in cell 35 on shaft 36. Shaft 36 and, hence, mirror 34 are locked in position by set screw 37, FIG. 1. The height of mirror 34 relative to base 9 and the perpendicularity thereof is adjusted by three leveling screws 38 extending through tapped holes in support member 39 and engaging base 9. The final adjustment is maintained by lock screws 40. Mirror 34 is focused by push-pull adjustment means 41 causing cell base member 42 to slide on member 39 in the focusing ways 42a, thereby adjusting the distance between assembly 4 and assembly 3. The angular position of mirror 34 is adjusted so that incoming radiation from mirror 21 is directed through prism assembly 5 and the return radiation is directed to mirror 22.

Referring to FIGS. 1, 2, 4, and 6, prism assembly 5 is illustrated as including a 70 degree lithium fluoride prism 43 mounted on a reference member 44 and held in position by top clamp 45 and bolts 46 extending through spacers 47 from cover 45 to member 44. Pad 48 is inserted between cover 45 and the top of prism 43 to provide a resilient mount for prism 43, thus, protecting prism 43 from stresses due to its mountings. As illustrated, member 44 is mounted on a pedestal 49 to provide the proper height for prism 43 so that it will be in the light communication path to bring about the desired light dispersion. Three leveling screws 50 enable the adjustment of prism 43 to cause the prism faces to be perpendicular with respect to base 9. Three screws 51 lock the position of prism 43 after adjustment by screws 50.

Referring to FIGS. 1, 2, 4, 5, and 6, Littrow mirror assembly 6 is illustrated as including pivot base 52 to provide proper height for pivot assembly 53 with respect to base 9. In pivot assembly 53 is disposed a shaft 54 extending from the top to the bottom of assembly 53 about which support member 55 for Littrow mirrors 56 and 57 is pivoted or rotated for scanning. Each of mirrors 56 and 57 are mounted on mounting plates 58 by means of clamps 59 and screws 60. Mounting plates 58 are secured by three set screws 61 extending through each clamp 59, through plate 58 and engaging member 55. Extending through the back of member 55 and engaging member 58 are adjusting screws 62 to cause in cooperation with screws 61 a rotation of mirror 56 about an axis parallel to base 9 and adjusting screws 63 to cause a similar rotation of mirror 57. This adjustment insures a lack of cross-talk between the two spectral regions scanned.

Member 55 is mounted to shaft 54 by precision bearings (not shown) to reduce wear and need of maintenance. The rotation axis of the Littrow mirrors 56 and 57 as provided by shaft 54 forms the alignment reference for the entire monochromator so that no adjustments are provided for pivot base and assembly 52 and 53.

Referring to FIGS. 1, 2, 4, 5, and 6, Littrow mirror drive assembly 7 is illustrated as including roller 64 mounted on member 55 in precision bearings to eliminate wear on driving cam 65 engaging roller 64, thereby insuring long life and trouble-free operation. Cam 65 is secured to cam shaft 66 which is supported by prelubricated bearings thereby eliminating maintenance and oiling requirements of the bearings in the monochromator. To the end of shaft 66 opposite cam 65 is secured pulley 67. D.C. (direct current) driving motor 68 having gear-head reduction drives pulley 69 disposed in alignment with pulley 67. Timing belt 70 engages pulleys 67 and 69 enabling motor 68 to drive cam 65 and, hence, rotate Littrow mirrors 56 and 57 to scan two desired spectral regions. The tension of timing belt 70 is adjusted by idler pulley 71 which may be vertically adjusted in slot 72, FIG. 4. Motor 68 is continuously variable in speed by means of a powerstat contained in control box assembly 73 whose control knob 74 extends through the cover of assembly 73, and, thus, enables adjusting the rate of scanning.

Figure 3:
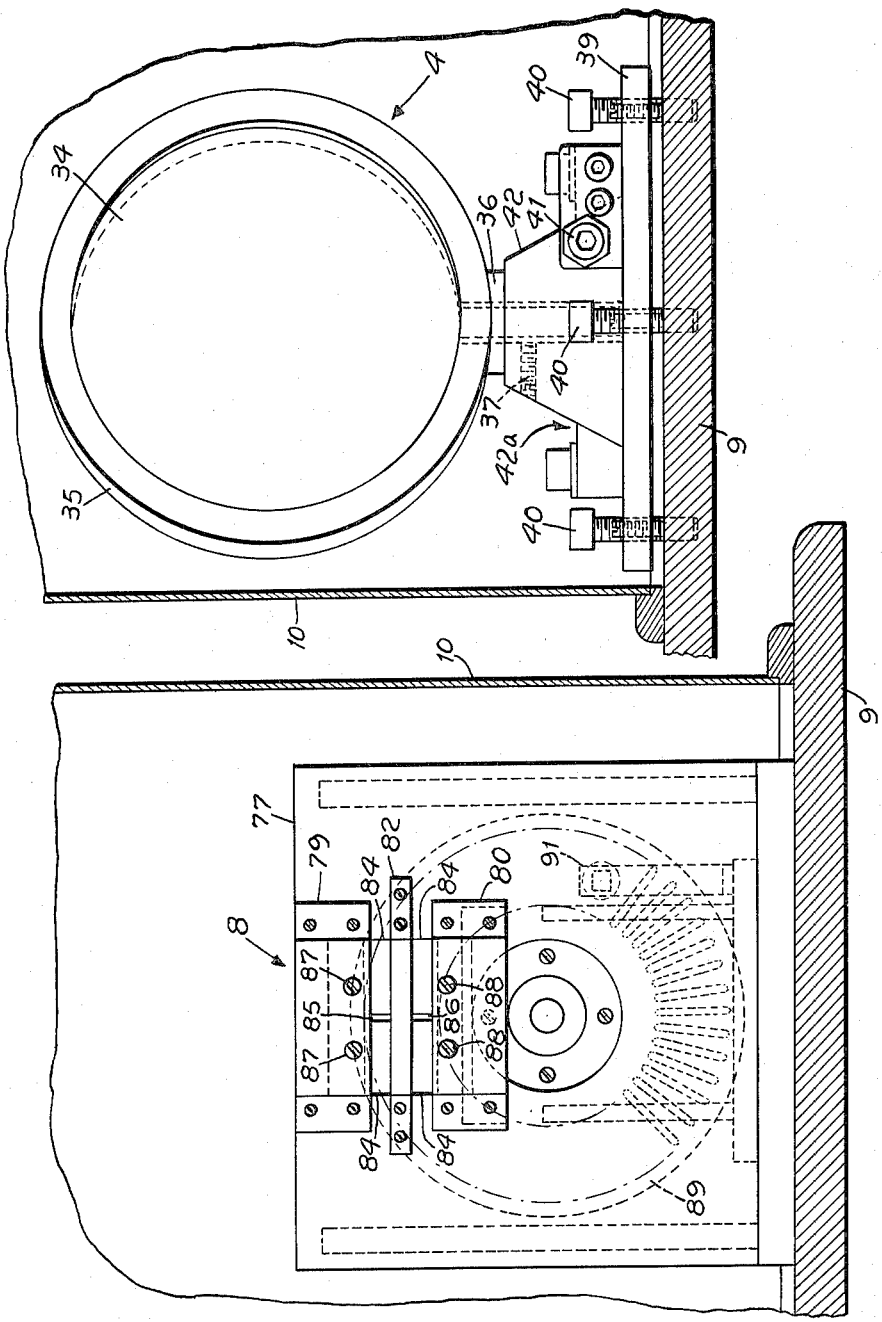
FIG. 3 is an elevational view partially in cross section taken along line 3—3 of FIG. 1.

Referring to FIGS. 1, 2, and 3, exit slit assembly 8 is illustrated as being disposed in registry with a second aperture 75 in enclosure 10 having secured therein adaptor 76 to which an optical arrangement may be connected in a light tight sealing relation to permit the individual spectral regions passed by assembly 8 to be coupled to their individual electronic radiation processing or detection system described hereinafter in connection with FIG. 9. Assembly 8 includes vertical member 77 having aperture 78 and in supporting relation to members 79 and 80 each having guides 81. Member 77 further supports member 82 having guides 83 intermediate members 79 and 80. Four blades 84 are disposed to engage guides 81 and 83, two forming exit slit 85 and two forming exit slit 86. Blades 84 forming exit slit 85 are slid in guides 81 and 83 to adjust the width of exit slit 85 to pass the desired infrared spectral region and secured in this desired position by means of screws 87. In a like manner blades 84 forming exit slit 86 are adjusted to provide the proper width for exit slit 86 for ultraviolet spectral region and screws 88 clamp blades 84 in the desired position.

Prior to emerging from exit slits 85 and 86, the radiation is modulated at a given rate, for instance, 1000 cycles per second (c.p.s.) by chopper disc 89 driven by synchronous motor 90. Synchronous motor 90 operates on 110 volt, 60 cycle line power at 1200 revolutions per minute to obtain the modulating frequency employed herein as an example. Disc 89 driven by motor 90 nominally would have 50 blades and spokes to obtain a chopping frequency of 1000 c.p.s. To permit synchronous detection in the radiation processing circuitry, a light source is disposed on one side of disc 89, for instance, in a depression in member 77 positioned to shine through the spokes of disc 89 and in alignment with photoelectric cell assembly 91 to provide a signal synchronized with the modulation of the radiation passed through exit slits 85 and 86. The light source could be a 6-volt bulb and the photoelectric cell could be a silicon cell which furnishes a photovoltaic output in synchronism with the chopper disc 89. Assembly 91 can be moved in slot 92 to provide any desired phase relationship between the synchronizing signal and modulated radiation at exit slits 85 and 86. Upon optimally positioning assembly 91, this assembly is locked permanently in position and serves to furnish the phasing information for synchronous detection in the radiation processing circuit of FIG. 9.

Under separate cover, but mounted on base 9, is control box assembly 73 containing a plug for the input power cord, main power switch and indicator light, the powerstat and rectifier to control the speed of motor 68 driving the Littrow mirrors 56 and 57, a line power fuse and terminal strip for supplying power to the various motors within the monochromator and to deliver to the radiation processing circuitry the synchronizing signal as derived by assembly 91. The actual connections from the terminal strip to the various motors and from assembly 91 to the terminal strip have been eliminated in an attempt to clarify the mechanical structure of the monochromator.

Having discussed hereinabove the structural features of the various assemblies included in the monochromator of FIG. 1, a description of the alignment procedure will better aid in an understanding of the various adjustments available in the monochromator and the operation thereof. Entrance slit 13 is adjusted to be perpendicular to base 9 by leveling screws 93. One way of obtaining the perpendicular relationship between entrance slit 13 and base 9 is to employ an accurate square observed by sighting through the entrance slit. An alternative method would be by means of a plumb bob if base 9 is carefully leveled. Similarly exit slits 85 and 86 are adjusted to be perpendicular to base 9 by leveling screws 94 and the desired gap for slits 85 and 86 are provided (nominally 1.1 millimeters for the upper infrared slit 85 and 0.9 millimeter for the lower ultraviolet slit 86 in the example of the spectral regions employed herein) and securely locked in place. The settings of the exit slit may be obtained conveniently with the aid of a machinist microscope.

To continue the alignment procedure, a light source is required. By sighting through the exit slits and entrance slit with the entrance slit open to maximum width for convenience, a light source may be placed along the entrance-exit optical axis of the instrument. A ribbon filament incandescent lamp, such as a GE 9AH81/2/1, forms a convenient source. The lamp should be placed so that a real image is formed on entrance slit 13 using an f/8 lens system to match the speed of the collimating mirror. Light passing through entrance slit 13 should be centered on mirror 21 in assembly 3. For convenience, a white card may be cut to the size of this mirror for ease in observation. Mirror 21 is next established perpendicular to base 9 by using two identical pins (4 inches high) as sighting guides. By placing the pins on base 9 and observing the reflected image in mirror 21 perpendicularity is established when the points of the virtual images and objects lie in a straight line. Adjustment screw 30 (FIG. 4) enables this perpendicularity adjustment. Mirror 21 is next adjusted so that collimating mirror 34 is filled with light, but with the center of the illuminating area one-quarter inch off center in a direction toward prism assembly 5. Adjustment device 31 is used for this rotation and a white card placed across collimating mirror 34 aids in obtaining this alignment.

Collimating mirror 34 is checked for perpendicularity to base 9. The two four-inch pins are convenient to accomplish this task. The center of mirror 34 should be adjusted to a height of four inches above base 9 and member 39 leveled by means of leveling screws 38 to render mirror 34 perpendicular to base 9. The ends of the two pin objects and virtual images should be aligned when perpendicularity is achieved.

Focus of entrance slit 13 onto exit slits 85 and 86 is next obtained. Collimating mirror 34 should be positioned within mirror cell 35 so that the center of the mirror lies along the axis of the mirror cell rotation shaft 36. This assures that rotating mirror 34 does not change the focus. If available, this setting could be conveniently obtained using a nodal slide on an optical bench. If such a device is not available, careful measurements with an accurate steel rule will allow this condition to be obtained to sufficient accuracy. Mirror 34 is rotated a convenient amount (8 to 15 degrees) off-axis and a good quality front surface mirror set perpendicular to base 9 is used to form the autocollimator sending the entrance beam back to mirror 22 on assembly 3 and then to exit slits 85 and 86 of assembly 8. Alternately, Littrow mirror assembly 6 may be positioned to form the autocollimator. Alignment of mirror 22 may be obtained at this time in the manner described previously with respect to mirror 21 so that the image of entrance slit 13 is positioned across the upper and lower exit slits 85 and 86. The perpendicular adjustment of mirror 21 would be accomplished by adjustment screw 32 and the desired rotation of mirror 21 would be obtained by adjustment device 33. Collimating mirror 34 may now be focused by driving mirror 34 along focusing ways 43 using the push-pull screw arrangements 41. Proper focus is obtained when entrance slit 13 is sharply focused on the plane of the exit slits 85 and 86.

The autocollimating mirror may now be removed and prism 43 mounted on its reference member 44. The faces of prism 43 are rendered perpendicular to base 9 by leveling screws 50 incorporating the 4 inch pins to indicate when perpendicularity is achieved. Collimating mirror 34 should be rotated on shaft 36 so that light from mirror 34 is centered on the face of prism 43. A white card placed in front of prism 43 may be used for ease of observation. A set screw 37 locks shaft 36 in position.

Littrow mirrors 56 and 57 are next adjusted. Member 55 is rotated by hand until either the upper or lower mirrors 56 and 57 reflects the light back through prism 43 to collimating mirror 34 and, thence, to exit slits 85 and 86. Rotation of each Littrow mirror about an axis parallel with base 9 by means of the cooperation of screws 61 and screws 62 and 63 assures that the upper slit image does not overlap the lower. This will insure lack of crosstalk between the infrared and ultraviolet spectral regions in case detectors used in the electronic circuitry are sensitive to both spectral regions. The next Littrow adjustment assures that the proper part of this spectrum will be scanned across the exit slits. This will require auxiliary light sources or filters to allow identification of a narrow band of wavelength near the center of the spectral regions of interest. Cam 65 is rotated by hand until mirrors 56 and 57 are half way through one scan. Rotate Littrow mirrors 56 and 57 using the push-pull adjustment arrangement including screws 61 and screws 62 and 63 until the center of the spectral band passes through the exit slit as identified by the detector output. The limits to the scan may now be adjusted by sliding Littrow mirror drive assembly 7 along slots 95 and 96 until the desired angular scan of Littrow mirrors 56 and 57 is obtained. These adjustments may be compromised for the ultraviolet and infrared spectral regions so that one spectral region, such as the ultraviolet spectral region, may be overscanned to obtain the desired infrared scan. For a 1.0 to 5.0 micron infrared scan using the 70 degree lithium fluoride prism, the ultraviolet region from 0.2 to 0.4 micron is slightly overscanned.

Cam 65 may be configured in a predetermined manner to provide linear dispersion in either one or the other of the spectral regions which allows for easier data reduction.

Referring to FIG. 8, there is illustrated therein schematically another embodiment of the monochromator of this invention. As in FIGS. 1 to 7 the input means includes entrance window 97 and adjustable entrance slit 98 with window 97 disposed at an angle with respect to entrance slit 98 to prevent multiple reflections. The scanning means includes collimator 99, prism 100, scanning mirror 101, mirror 102, and means not illustrated to drive scanning mirror 101, the rotation of mirror 101 being indicated by arrows. The output means includes a pair of exit slits 103 disposed in a common vertical plane extending into, or perpendicular to, the sheet of drawings with the top exit slit of the pair being illustrated in FIG. 8. Condensing optics 104 are disposed adjacent the exit of each exit slit 103 to direct the radiation passing through the appropriate exit slit to the appropriate radiation detector 105, the output of which is coupled to the electronic circuitry for radiation detection to be hereinbelow described with reference to FIG. 9. Optics 104 is the type of equipment that would be secured to adaptor 76, FIG. 1, to direct the radiation passing through exit slits 85 and 86 to the appropriate processing circuitry. As in the embodiment of FIGS. 1 to 7, entrance slit 98 is adjustable through a micrometer means to permit the passage of light to collimator 99 which in the embodiment illustrated in FIG. 8 is split on its horizontal axis, the axis parallel with the sheet of drawings, to provide two separate collimating arrangements each having a focusing screw 106 for independent adjustment thereof to appropriately focus the spectral region which is impinging thereon. Thus, the difference between the embodiment of FIGS. 1 to 7 and the embodiment of FIG. 8 of the monochromator of this invention is that in FIG. 8 the collimator or collimating mirror is split to provide the two channel capabilities of the instrument while in the embodiment of FIGS. 1 to 7 it is the Littrow mirror that is split to provide the two channel capabilities of the instrument. The other components are substantially the same in FIG. 8 as they are in FIGS. 1 to 7.

As illustrated in FIG. 8, radiation chopper or modulator 107, similar in structure to that disposed adjacent the exit slit assembly 8 (FIG. 1), is illustrated to be adjacent entrance slit 98. It is to be understood that the radiation chopper or modulating means can be disposed adjacent the entrance slit in the embodiment of FIGS. 1 to 7 and that the radiation chopper in FIG. 8 could be disposed adjacent the exit slit 103. Light source 108 and photoelectric cell 109 cooperate to produce the synchronizing signal utilized to synchronously detect the radiation as described hereinabove with reference to assembly 91 and chopper disc 89, FIG. 1.

Referring to FIG. 9, there is illustrated therein one of two identical channels used to detect the radiation emerging from the exit slits of either embodiment of the monochromator described herein. For ease of explanation, however, the description will be carried on with reference to components illustrated in FIG. 8. The radiation detector 105, a lead selenide cell for detection of infrared radiation or a photomultiplier for detection of ultraviolet energy, have their output coupled to cathode follower 110 to match the high impedance of the radiation detector to the input of preamplifier 111. Preamplifier 111 has a feedback stabilized gain in the order of 1500. Cathode follower 112 is coupled to the output of preamplifier 111 to drive a low impedance amplifier 113 having associated therewith a manual gain control to permit the gain of the amplifier to be adjusted so that the signal may be raised to a level selected by the operator. The output of amplifier 113 is coupled to cathode follower 114 to match the impedance of amplifier 113 to bandpass filter 115. Bandpass filter 115 with the example herein employed has a center frequency of 2,000 c.p.s. with a bandwidth of 150 cycles and a cut-off slope of 40 db (decibels) per octave. The output of filter 115 is coupled to synchronous detector 116 to which is applied the synchronizing signal picked up by photoelectric cell 109, for instance, and coupled through pulse amplifier 117 to detector 116. Synchronous detector 116 is employed in preference to a passive type detector to obtain an improvement in signal-to-noise ratio. The output of amplifier 117 is used to gate the detector on and off at a synchronous rate to detect the radiation. The output of detector 116 is coupled to lowpass filter arrangement 118 including a bank of lowpass filters which may be selectively coupled into the circuit at the option of the operator. Thus, the bandwidth of the system may be narrowed when using lower scanning rates to obtain an improvement in signal-to-noise ratio and a greater detectivity of weak targets. If desired the filter selector could be coupled to the scanning mirror drive control to set the bandwidth automatically for each scanning rate. Two output connectors are coupled to filter arrangement 118 to provide for simultaneous recording and visual observation on an oscilloscope. If a dual trace oscilloscope is used the ultraviolet and infrared spectral regions could be observed on a single display.

Referring to FIG. 10, the power supply contained in control assembly 73 is illustrated. Line voltage input is coupled through a fuse 119 to the line switch 120 and, hence, to powerstat 121 whose output is rectified by rectifier 122 to derive the control voltage for Littrow drive motor 68 (FIG. 1). A bulb 123 is coupled across the input to powerstat 121 to give an indication of power "ON." The line voltage is coupled prior to powerstat 121 for application directly to chopper motor 90 (FIG. 1). This same line voltage is coupled to transformer 124 to provide sufficient voltage to operate bulb 125 which is disposed on one side of the chopper or modulating disc in either the arrangement of FIG. 1 or FIG. 8. The light shining through the chopper disc is picked up by photoelectric cell 109, FIG. 8, or its equivalent in FIG. 1 to provide a synchronizing signal for coupling to amplifier 117 of both radiation detection signaling systems one of which is illustrated in FIG. 9.

While I have described above the principles of my invention in connection with specific apparatus, it is to be clearly understood that this description is made only by way of example and not as a limitation to the scope of my invention as set forth in the objects thereof and in the accompanying claims.

I claim:

1. A dual spectral region scanning monochromator for simultaneously and continuously scanning two different spectral regions comprising:
  a single entrance slit for passing light having wavelengths included in both of said spectral regions, one of said spectral regions being disposed in the infrared spectrum and the other of said spectral regions being disposed in the ultraviolet spectrum;
  a first exit slit for said one of said spectral regions disposed in a first vertical plane;
  a second exit slit for said other of said spectral regions disposed in said first vertical plane;
  said first and second exit slits being disposed in said first vertical plane in spaced relation one above the other with the center of each of said exit slits being in vertical alignment;
  a collimating mirror disposed between and in light communication with said entrance slit and said exit slits;
  a prism in light communication with said collimating mirror;
  a Littrow mirror in light communication with said prism; and
  means coupled to said Littrow mirrow for rotation thereof through a given arc of a circle to continuously scan simultaneously the light having wavelengths in said one of said spectral regions across said first exit slit and the light having wavelengths in said other of said spectral regions across said second exit slit;
  a selected one of said collimating mirror and said Littrow mirror including
    a first independently adjustable section disposed in a second vertical plane at a predetermined angle with respect to said first vertical plane to reflect light having wavelengths in said one of said spectral regions; and
    a second independently adjustable section disposed in a third vertical plane at predetermined angles with respect to said first and second vertical planes to reflect light having wavelengths in said other of said spectral regions.

2. A monochromator according to claim 1, wherein said collimating mirror is selected to include said first and second independently adjustable sections.

3. A monochromator according to claim 1, wherein said Littrow mirror is selected to include said first and second independently adjustable sections.

4. A monochromator according to claim 1, wherein said prism is a 70 degree lithium fluoride prism.

5. A monochromator according to claim 1, wherein said means for rotating includes
- a vertically disposed shaft;
- a member to support said Littrow mirror in a vertical relationship;
- said member having one side thereof rotatably engaging said vertical shaft;
- a roller connected to the side of said member opposite said one side;
- a cam having a predetermined configuration engaging said roller to cause rotation of said Littrow mirror; and
- means to drive said cam.

6. A monochromator according to claim 5, wherein said means to drive includes
- a horizontally disposed shaft carrying said cam on one end thereof;
- a first pulley connected to the other end of said horizontal shaft;
- a second pulley spaced from and in alignment with said first pulley;
- a timing belt engaging said first and second pulleys;
- an idler pulley disposed intermediate said first and second pulleys engaging said belt;
- said idler pulley being vertically adjustable to adjust the tension of said belt;
- a motor driving said second pulley; and
- continuously variable power supply means coupled to said motor to control the speed thereof and, hence, the rate of said scan.

7. A monochromator according to claim 1, further comprising
- a disc vertically disposed between said entrance slit and said exit slits intercepting the light having wavelengths in both said spectral regions including therein throughout its entire area radially disposed slots equally spaced from each other; and
- a synchronous motor coupled to drive said disc, said motor and said disc cooperating to modulate the light having wavelengths within both of said spectral regions.

8. A monochromator according to claim 7, wherein said disc is disposed adjacent said entrance slit to modulate the light having wavelengths within both said spectral regions after passing through said entrance slit.

9. A monochromator according to claim 7, wherein said disc is disposed adjacent said exit slits to modulate the light having wavelengths within both said spectral regions prior to passing through said exit slits.

10. A monochromator according to claim 7, further comprising
- a source of light distinct from the light emerging from said entrance slit disposed relative to said disc to shine therethrough for modulation by said radially disposed slots;
- a light detector compatible with the light of said source of light to produce a synchronizing signal; and
- means in independent communication with each of said exit slits, each of said means including a synchronous detector responsive to said synchronizing signal to separately detect the light having wavelengths in the associated one of said spectral regions.

11. A monochromator according to claim 1, further comprising
- a window disposed adjacent to, in registry with, and at a predetermined angle to said entrance slit to prevent multiple reflections from entering said entrance slit.

12. A monochromator according to claim 11, wherein said window is a calcium fluoride window.

References Cited by the Examiner
UNITED STATES PATENTS

| | | | |
|---|---|---|---|
| 2,587,451 | 2/1952 | Farrand | 88—14 |
| 2,652,742 | 9/1953 | Walsh | 88—14 |
| 2,679,184 | 5/1954 | Atwood | 88—14 |
| 2,679,185 | 5/1954 | Atwood | 88—14 |
| 2,797,609 | 7/1957 | White | 88—14 |
| 2,927,502 | 3/1960 | Watrous | 88—14 |
| 2,937,561 | 5/1960 | Saunderson et al. | 88—14 |
| 2,948,185 | 8/1960 | Ward et al. | 88—14 |
| 2,964,998 | 12/1960 | Middlestadt | 88—14 |
| 3,015,984 | 1/1962 | Martin | 88—14 |
| 3,020,794 | 2/1962 | Reichel | 88—14 |
| 3,039,353 | 6/1962 | Coates et al. | 88—14 |

DAVID H. RUBIN, *Primary Examiner.*

JEWELL H. PEDERSEN, *Examiner.*

RONALD L. WILBERT, *Assistant Examiner.*